J. B. Bell,
Stave Jointer.
No. 106,988.  Patented Sep. 6. 1870.
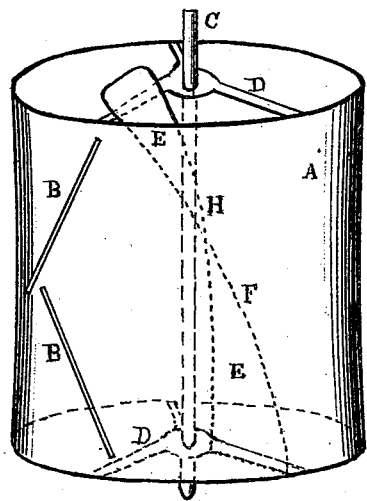
Witnesses
Leonard S. Johns
W. G. Bell
Inventor
John B. Bell

United States Patent Office.

JOHN B. BELL, OF PITTSBURG, PENNSYLVANIA.

Letters Patent No. 106,988, dated September 6, 1870; antedated August 25, 1870.

IMPROVEMENT IN STAVE-JOINTER.

The Schedule referred to in these Letters Patent and making part of the same

I, JOHN B. BELL, of city of Pittsburg, county of Allegheny and State of Pennsylvania, have invented a new and useful Improvement in Stave-Jointers, or for Relieving Stave-Jointers from Shavings, of which the following is a specification.

The invention consists in placing within a cylindrical stave-jointer, back of each knife or pair of knives or cutters, an oblique spiral plate of sheet-iron, or its equivalent, commencing at the top or one end of the cylinder, and receding from the knife or pair of knives toward the bottom or end of the cylinder from which the shavings are to be driven out, the edge of the plates fitting the inside of the cylinder, and extending toward the center shaft.

The bottom or end of the cylinder being open, except the radial arms to which the spiral plates are attached, the plates then form a passage (without any interruption) for the shavings, and, at the same time, act as a fan to blow them out. The spiral plates may extend only the length of the cylinder, or project beyond the end opposite to that from which the shavings are blown out, if a better draught is required.

The cylinder is rotated with the center ends of the knives foremost. The shavings enter the passage made by the spiral knives, and are blown out by the rotary motion of the cylinder and the blast produced by the plates.

A is the cylinder in perspective.
B B, the openings for the knives.
C, the shaft.
D D, the radial arms of the cylinder.
F, the edge of the spiral plate next the cylinder, shown by the dotted lines.
H, the edge next the shaft.
E, the plate.

I claim—

The plate E, substantially as and for the purpose described.

JOHN B. BELL.

Witnesses:
　LEONARD S. JOHNS,
　W. G. BELL.